United States Patent [19]

Abrahams et al.

[11] 3,916,692
[45] Nov. 4, 1975

[54] NOVEL INJECTOR MECHANISM
[75] Inventors: Louis Abrahams, Worcester; Burleigh M. Hutchins, Jr., Framingham, both of Mass.
[73] Assignee: Waters Associates, Milford, Mass.
[22] Filed: Nov. 14, 1973
[21] Appl. No.: 415,727

[52] U.S. Cl. .......................................... 73/422 GC
[51] Int. Cl.² ........................ G01N 1/28; G01N 1/10
[58] Field of Search ......... 73/422 GC, 23.1, 61.1 C; 251/331, 332

[56] References Cited
UNITED STATES PATENTS

| | | |
|---|---|---|
| 3,166,939 | 1/1965 | Koeller ........................... 73/422 GC |
| 3,205,701 | 9/1965 | Szonntagh ...................... 73/422 GC |
| 3,777,572 | 12/1973 | Hrdina ............................. 73/61.1 C |
| 3,827,303 | 8/1974 | MasaruShiina .................. 73/422 GC |

FOREIGN PATENTS OR APPLICATIONS
1,187,832   3/1959   France .............................. 251/331

Primary Examiner—S. Clement Swisher
Attorney, Agent, or Firm—Robert A. Cesari; John F. McKenna; Andrew F. Kehoe

[57] ABSTRACT

Process, and apparatus for use therewith, for efficiently injecting liquid samples into high pressure fluid streams. The apparatus is particularly advantageous in combination with liquid chromatography systems and is characterized by back-filling of a sample loop from a point proximate the outlet of the injection apparatus, an incremental increases in the size of the loop as it becomes more remote from the filling situs, and a minimum of valving and deadspace normally associated with valving.

29 Claims, 10 Drawing Figures

NOVEL INJECTOR MECHANISM

BACKGROUND OF THE INVENTION

For a long time, there has been difficulty in efficiently injecting small quantities of liquids into high pressure liquid streams in such a way as to avoid excessive dilution of the liquid within the stream into which it is to be injected.

The most common approach to the problem has been the use of a hypodermic needle which is pushed through an elastomeric septum which is in turn held in place by a threaded cap. This approach has the advantage of facilitating delivery of the sample directly to the point desired, say the inlet of a chromatography column, and of not utilizing valves containing dead space. However, the approach has the drawback of being pressure limited, i.e. it is not dependably operable at high pressures because of frequent back leakage through the septum. Indeed, this procedure demands skill to minimize the incidence of such back leakage at any substantial pressure. The septums commonly fail after 5–10 uses; even exceptionally skilled technicians can obtain only about 50 injections with the same septum under moderate pressures. If the above-mentioned problems were overcome, the septum-type approach would still be objectionable for many sensitive applications because elastomeric materials generally have leachable chemical components which contaminate the samples being injected. There are some relatively inert chemical polymers but these tend to have inferior elastomeric properties, and tend to leak even more frequently. High pressure syringes do not help much. Not only do syringe seals tend to leak, with consequent loss of sample, but there is a volume-compression factor inherent in their use which interferes with precise sample measurement.

In many applications, the aforesaid problems have sufficient impact to reduce markedly the value of techniques like liquid chromatography. For example, in liquid chromatography work the value of a sample may be thousands of dollars, or even tens of thousands of dollars, in terms of the cost, labor and equipment time, used to isolate or synthesize the sample. Loss or contamination of such a sample is a catastrophe in research work. Rather than risk such loss, a scientist will utilize lower risk analytical processes even though they may be more expensive and less precise.

Consequently, in the field of liquid chromatography a considerable amount of effort has been expended in the development and construction of improved sample injecting devices. For examples U.S. Pat. No. 3,585,862 to Hrdina; U.S. Pat. No. 3,374,660 to McKenney et al.; and U.S. Pat. No. 3,631,724 to Oster et al., are all descriptive of such work. None of the devices disclosed by such workers have satisfied the requirement for a reliable way to inject small quantities of liquid into a high pressure flow sytem without contamination, without pressure instability caused by loss of compression in the system, and without an unfavorable distribution of sample to the column in terms of excessive entrance time due to a so-called "peak spreading". Peak spreading is a term given to the phenomena whereby the sample is excessively diluted in the injector apparatus before entering the column. Consequently the peaks, appearing on an analytical chart descriptive of the composition leaving the column, are less distinct, i.e. are "spread" into lower less definable shapes.

Attempts to provide devices having desired reliability have included the use of relatively rigid plastic materials. (By "relatively rigid" is meant rigid as opposed to elastomeric synthetic polymers of the type used in gaskets at normal pressures.) These rigid materials have been used in making seats or other seal structures for valves used in injector mechanisms. Problems arise in use of such materials, they tend to absorb (and desorb) some of the broad spectrum of chemical compounds which they can be expected to contact. This feature not only tends to change their dimensions but also tends to provide a source for contaminants. Some tend to cold flow at high pressures. This becomes a major problem, even with such relatively creep-resistant materials as the polyacetal-type, whenever an attempt is made to incorporate them in tiny valves meant to moderate the flow of batch samples in the microliter range.

Another approach to the problem of injecting samples in chromatographic work has been the immobilization of a liquid to be injected in a capsule, placing the capsule in the stream of inlet fluid and breaking it. There is a substantial problem of contamination in this procedure; even fingerprints on the capsule can be a problem. Moreover, the release must be instantaneous with no loss of sample on the capsule material. The capsule must be entirely full to assure no compressibility problem, thus a different-size capsule must be used for different-sized samples. In general, this approach has not been suitable for sensitive liquid chromatography applications. It has found some acceptance in gas chromatography.

The pre-existing state of the injector art, on a cost/benefit basis, is best exemplified by a six-port valve manufactured by Waters Associates of Milford, Mass., under the trade designation C906. This valve operates suitably to 1000 psi ambient temperatures. The valve, in one mode, makes it possible to inject samples into an isolated loop while a pump continues to supply the chromatographic column. After the injection is complete, the valve is switched into a mode which brings liquid being pumped into the column through the loop and sweeps it into the chromatograph. Even these valves are not recommended for service over 300 psi at 150°C.

The thrust of innovation by others in this area appears to be development of small volume valves that really serve as sample holding devices, e.g. a slide valve as described in U.S. Pat. No. 3,748,833 to Karas et al., and can be pivoted or pushed from a sample-receiving position to a sample-flushing position. These devices are not particularly advantageous. Many depend upon elastomers for sealing limits; such dependence interferes with the structural stability of the valves because of cold flow.

Thus, the present time, there has been no apparatus suitable for use in injecting small liquid samples into high pressure systems without undesirable risk of loss, contamination or dilution of the sample and also loss of constant pressure in the system.

Indeed no system is believed to have been offered commercially which can be dependably operated at pressures above about 3000 psi and up to 6000 psi or even higher.

SUMMARY OF THE INVENTION

It is therefore, an object of the present invention to provide a novel process and novel apparatus for injecting small samples of liquid into a high-pressure fluid system comprising at least one, but advantageously more than one, of the following novel features:

1. minimal deadspace, i.e. the ability to eject substantially all of the sample from the apparatus; pl
2. means to minimize — indeed practically eliminate — dilution of the sample caused by contact with the structure of the injection apparatus before ejection therefrom; e.g. to minimize peak-spreading;
3. relatively simple construction allowing easy disassembly for maintenance and inspection;
4. suitability for use without wetted elastomeric surfaces;
5. leak proof over an improved temperature range and at pressures up to and above 6000 pounds per square inch;
6. suitability for use with samples down to a fraction of a microliter in size;
7. overpressure protection for valving elements;
8. easy manipulation;
9. ability to inject a large range of sample sizes while maintaining such aforesaid advantages identified above as (1), (2), and (6).

Other objects of the invention will be obvious to those skilled in the art on reading this application.

The above objects have been substantially achieved by development of a complex valve, (i.e. a valve comprising a plurality of valve elements) as will be described in detail below.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

Figure 1:
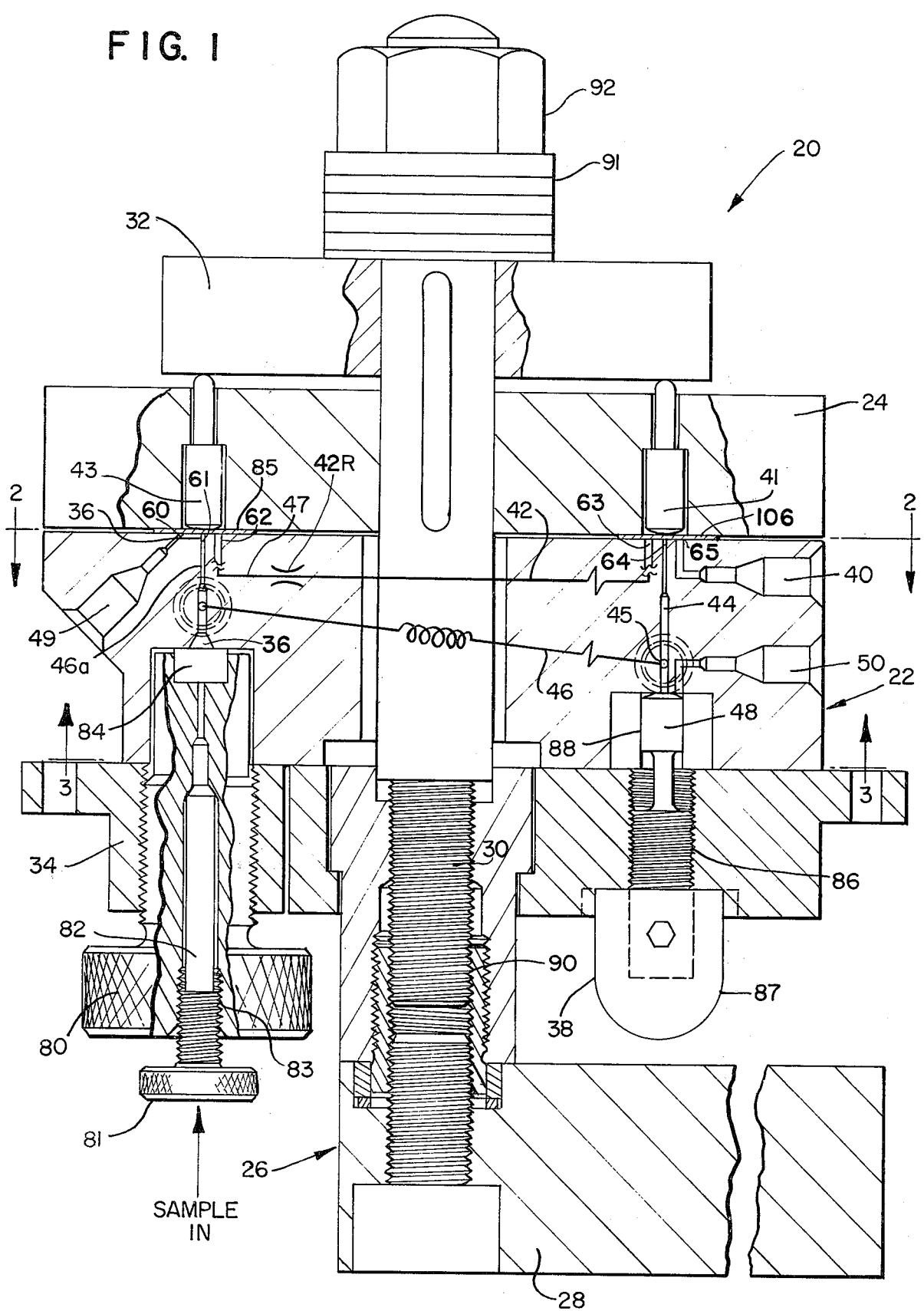
FIG. 1 is a plan view from the bottom of an injection valve apparatus constructed according to the invention. The view is schematic in some details to facilitate a description thereof.
Figure 4:
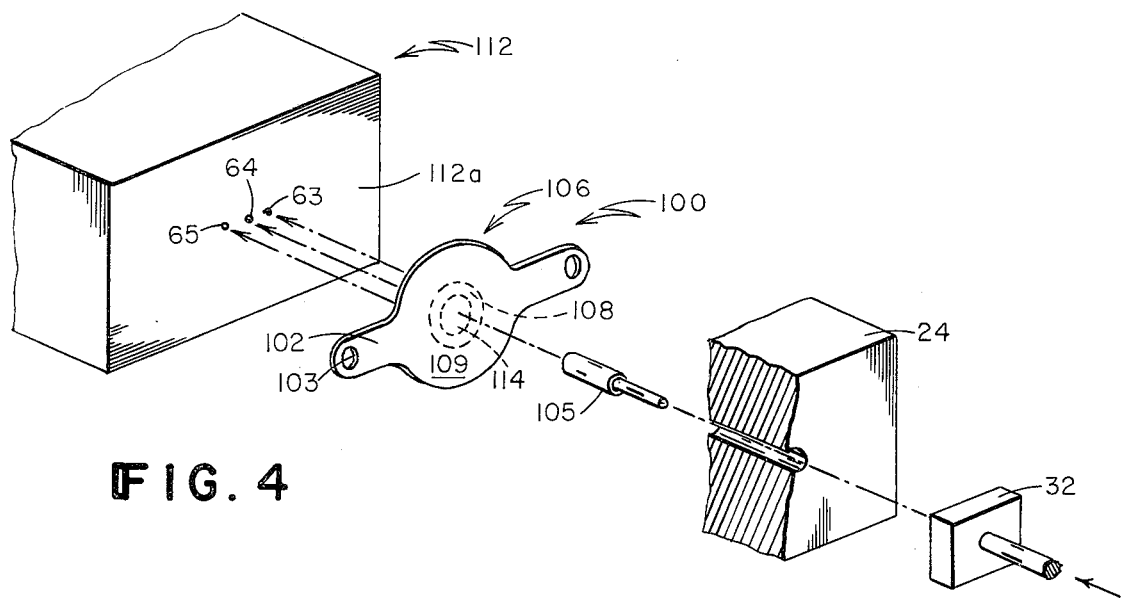
Figures 4A, 4B, 4C:
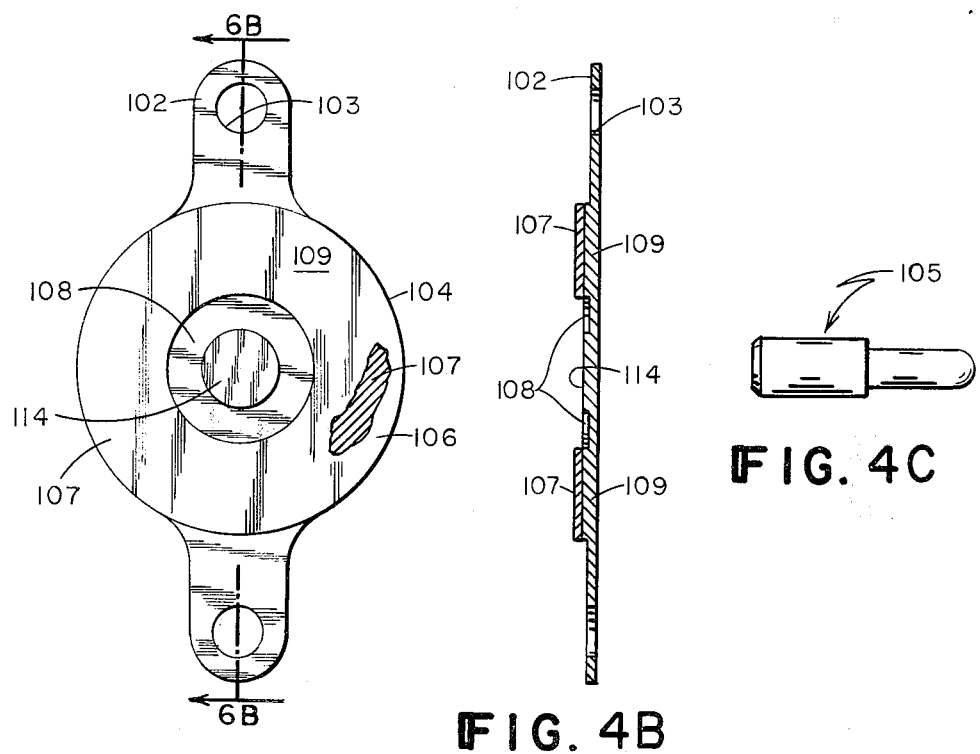

FIGS. 4, 4A and 4B and C show a valve of particular use in the apparatus of FIG. 1.

Figure 5:
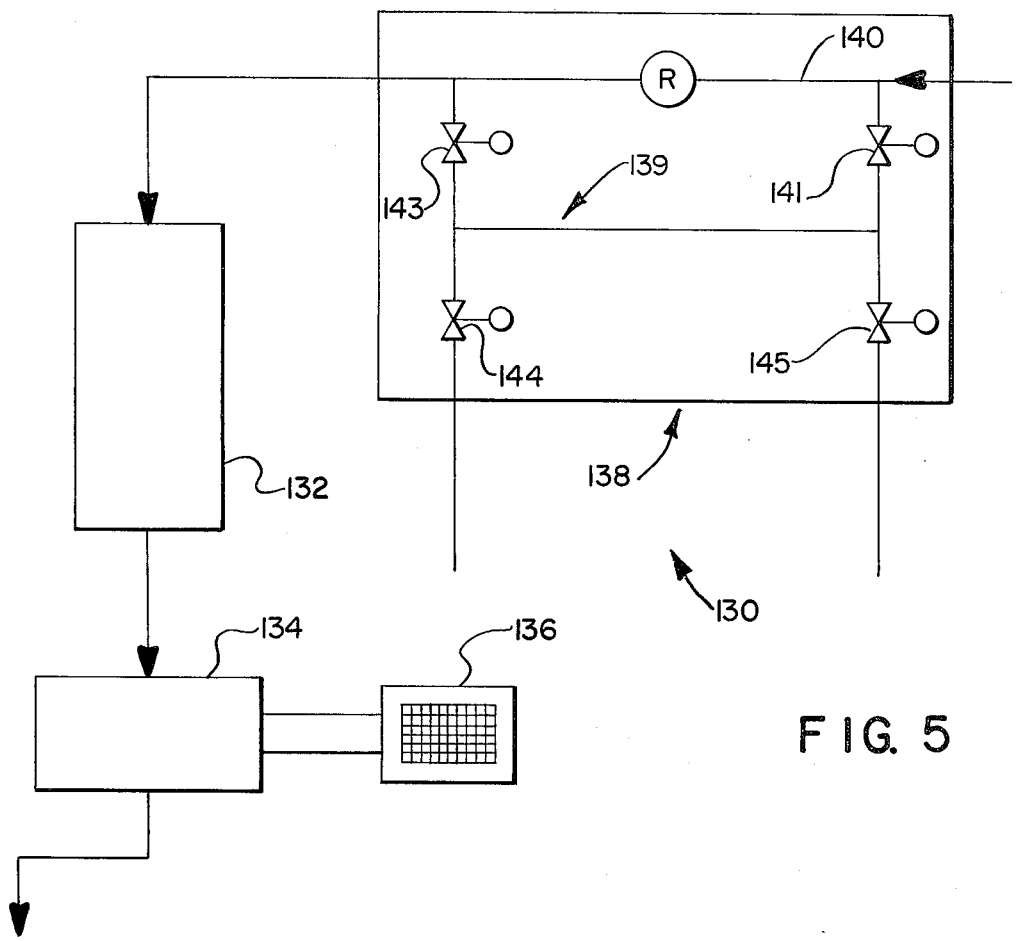

FIG. 5 is a schematic diagram of a sample injecting scheme utilizing the invention.

Figure 6:
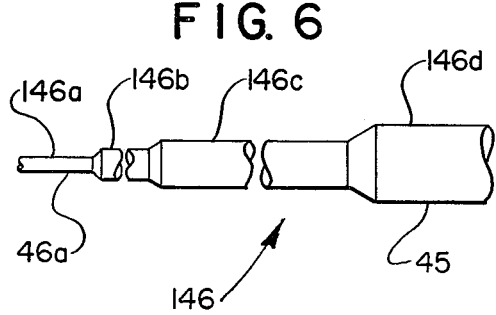
Figure 6A:
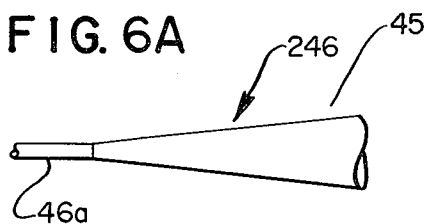

FIGS. 6 and 6A illustrate, schematically, sample loops useful with the apparatus of the invention.

FIG. 1 illustrates an injector valve apparatus 20 which is comprised of a central manifold member 22, a rearward valve member 24, a valve-operating means 26 which comprises valve-operating handle 28, valve stem 30, and valve-operating block 32. Moreover, a forward plug valving member 34 forms access means to an injection port 36. A valve operating handle 38 forms means to select flow paths through a conduit system with manifold 22 and described in more detail below.

Manifold 22 comprises the following:

a. Inlet Port 40 forming means to transmit a liquid into the manifold. Inlet port 40 communicates at all times (through valve 41 primary conduit 42 and valve 43) with outlet port 49. Moreover, inlet port 40 communicates with a secondary conduit 44 when valve 41 is in open position.

b. Secondary conduit 44 communicates with sample-receiving conduit, hereinafter called sample loop 46. A vent valve 48 operated with handle 38 forms a means to open a passage between one end 45 of loop 46 and vent, i.e. drain, port 50. The use of this vent port will be described elsewhere in the specification.

c. End 47 of Loop 46 communicates with sample - injection port 36. The joinder of loop 46 and Port 36 is immediately adjacent an inlet to valve 43. When valve 43 is open, loop 46 communicates with outlet port 49.

Loop 46, as shown in the illustrated embodiment of the invention, is noted to extend to essentially the face of the diaphragm 85, (See FIGS. 4 through 4B) forming a part of valve 43. Likewise, sample injection port 36 extends almost to the face of the same diaphragm. This is because the sample injection is advantageously carried out by use of a hypodermic-type needle arrangement whereby the needle extends into conduit section 46a. In such a situation, the sample loop 46 will form a concentric circle within conduit 46a and fill the annulus formed by the wall of this conduit and the hypodermic needle. Conversly, the sample injection will be from the hypodermic needle in the immediate vicinity of valve 43. The importance of this feature whereby the sample-injection port and sample loop both end proximate valve 43, i.e. proximate outlet port 49 is that it assures a back-filling of the sample into the sample loop, a feature that will be explained in more detail hereinafter.

Figure 2:
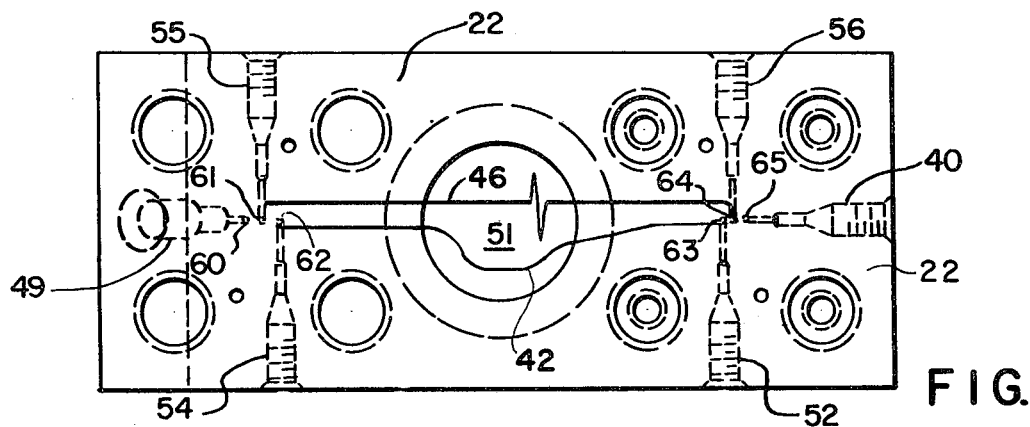
FIG. 2 is a section along line 2:2 of FIG. 1, but showing only the manifold block and with left and right reversed.
Figure 3:
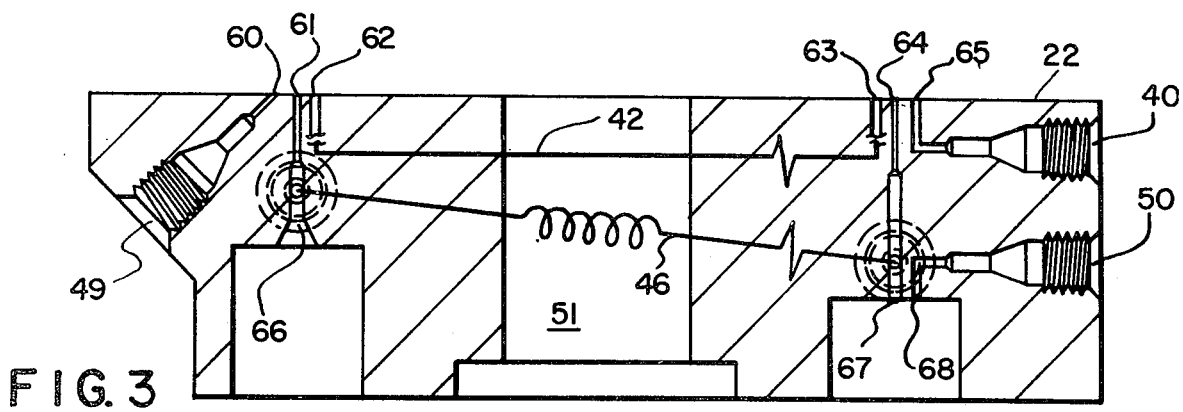
FIG. 3 is a section, in plan view, through the manifold section of the apparatus of FIGS. 1–2.

FIGS. 2 and 3 show the manifold member 22 and the positions of various conduit and valve connections therein. As in FIG. 1, conduit 42 and sample loop 46 are shown schematically. Center hole 51 is to accommodate valves operating means 26 which is utilized to open and close valves 41 and 43 as will be described below. Ports 52 and 54 are to receive fittings which connect valves 41 and 43, respectively, to conduit 42. Ports 55 and 56 receive fittings to connect loop 46 to injection port 36 and valve 48. The fittings themselves may be conventional, make no essential contribution to the patentability of the subject matter and are not shown in the drawings.

Members 22, 24 and 34 are held in compression by nuts and bolts which, although not shown, are readily understood by those skilled in the art.

Referring to FIG. 2, it will be seen that there are three orifices on the left side of the manifold member 22 which are identified as 60, 61, and 62 respectfully, and three orifices on the right side of manifold member 22 which are identified as 63, 64, and 65. These groups of orifices form fluid access means to valve 43 and 41 respectively.

Similarly, FIG. 3 illustrates one orifice 66 on the left side thereof and two orifices 67 and 68 on the right side thereof. Orifice 66 forms means for sample fluid to be fed into valve 43. Orifices 67 and 68 are utilized as part of vent valve 48. Orifice 67 is connected to orifice 61 via sample loop 46. Orifice 68 is connected to drain 50.

Referring again to FIG. 1, it is seen that forward valving member 34 has threaded thereinto a plug member 80 which contains axially positioned within it, a receptacle 82 for an injection means such as a hypodermic needle. No such needle is shown in the drawings because those skilled in the art will be entirely familiar with the type of device that is useful. The sample injection is made by removing a sample plug 81 from threads 83 and inserting a syringe into plug member 80. This is done while valves 43 and 41 are closed so all liquid entering inlet port 40 is proceeding through primary conduit 42. Hypodermic syringe is positioned so that the needle goes through a polymer seal member 84 and close to the face of a diaphragm 85, and with drain 50 opened to loop 46 by releasing valve 48, the sample is placed in loop 46. The sample liquid back-fills loop 46 from the end of conduit 46a, close to valve 43, backwards into loop 46. Displaced fluid is pushed through drain port 50. When the loading of loop 46 is completed and the syringe is removed, plug 81 is replaced and the vent is closed, then valves 41 and 43 are opened and, because of the flow resistance inherent in the length and relatively small diameter of loop 42, the flow from inlet 40 proceeds through couduit 44 valve 48 and loop 46–46a directly out of outlet port 49 into, say, a chromatography column.

On the other side of forward valving member 34 is operating means 38 for operating valve 48. This device too is threaded into forward valving member 34. This threading, at 86, controls the speed by which the knob 87 can be used to push plunger 88 forward to close valve 48. As indicated above, when valve 48 is open, all substantial flow of liquid from valve 41 to valve 43 will take place through valve 48.

A novel valve found to be useful with the invention is described in FIGS. 4, 4A and 4B.

Before describing the valve in detail, the following list of advantageous features is set forth:

a. The valve has substantially no excess volume not serving to augment the flow capacity thereof.
 b. the valve has no conventional elastomeric structural members; but it does have a thin, less than about 0.002 inches and advantageously about 0.001 inches thick, coating of a ductile material, i.e. a lead, gold, copper or polymeric coating like a polytetrafluoroethylene on a portion thereof. Polytetrafluorethylene is advantageous because of its chemical resistance but, in general, a thin elastomeric coating will resist any excessive feathering at high pressures.
 c. There is substantially no deadspace in the valve; by "deadspace" is meant volume wherein liquid can be deposited and resist quick-removal by flushing the valve. The illustrated valve has no deadspace and only about 0.0001 in. 3 of volume to be flushed; even this volume can easily be reduced to a small fraction of that if required.
 d. The valve can be quickly and conveniently moved between open and shut positions by a push-pull mechanism, thereby making it particularly well adapted to automatic control.
 e. There is little or no valve structure promoting mixing or disturbance of plug-flow of liquid therethrough.
 f. The valve provides an effective means to allow the joinder of one fluid with an existing flow path. As such, it serves not only the function of a valve but a valved T-connection in a piping system.
 g. The valve can be easily inspected and replaced.

The thin stainless steel disk comprises a polytetrafluroethylene coating of about 0.001 inch thick as a sealing means. In fact this disk is at once a gasket and a diaphragm because the coating serves as a seal in high-pressure applications.

FIG. 4 through 4B illustrate a valve 100 comprising a generally flat, thin, metallic disc 106 with positioning ears 102 apertured at 103 to provide means to position the valve to structure of an assembly. The ears are slightly recessed in the illustrated embodiment. The main body 104 of the valve comprises operating disk 106 which is a diaphram of stainless steel, a coating of a corrosion - resistant, chemically inert, polymer 107 about 0.001 inch thick on the outer wetted annular surface 109 thereof. Disk 106 has in its face a circular groove 108 adapted to form a flow path. The valve comprises, on a single face 112a of the housing inlet and outlet conduits necessary for its operation, e.g. 63, 64 and 65.

A valve operating rod 105 is centrally mounted with respect to disk 106 to flex it downwardly into contact with housing 112. When the disk is allowed to flex away from housing 112, liquid may flow into (or out of, as in the present apparatus) the valve structure from a centrally located port 64 which is blocked by central sealing surface 114, when the disk is flexed toward port 64.

In operation of such valves can be best described by treating valve 100 as serving as valve 41, of FIG. 1. When the disk is in its closed position, i.e. with central sealing face 114 pressed against conduit 64 by operating rod 105, liquid can flow from inlet 40 through inlet port from conduit 65 halfway around surface 114, via the conduit formed by peripheral groove 108 and housing member 112a, and out port to conduit 63 which serves as the outlet port of the valve. However, when the disk is allowed to resume its normal and non-flexed position, face 114 is retracted from contact with the port to conduit 64 and liquid entering the valve through port 65 is free to flow through the port to conduit 64 as well as the port to conduit 63 (in operation of valve 41, of course, the resistance to flow in conduit 42 dictates substantially all flow will leave conduit 64 not conduit 63).

In most uses of the apparatus, it will be desirable to open and close valves 41 and 43 simultaneously. For this reason it is convenient to have each valve of the same construction although the important characteristics of the valve are of primary importance only in the application, as in valve 43 between the sample loop 46 and outlet port 49, wherein injected sample passes therethrough. (In addition to this primary importance relating to avoiding peak spreading and sample loss, there are the general advantages relating to easy flushing, low maintenance, and so forth which, of course, apply to the valve whenever it is used and are responsible for its general usage in the apparatus disclosed in FIGS. 1 through 3.

In operating valves 41 and 43 simultaneously, it is important to assure adequate closure without overpressure on the valve disks. This is achieved, as illustrated in FIG. 1, by use of a handle 28 which is affixed to a drawbar 90. The drawbar is keyed for motion in valve operating block 32 and rearward valving member 24. Thus when handle 28 is turned, block 32 is carried forward pushing operating rods 105 against the diaphragms of the valves. A series of spring washers 91 is mounted between nut 92, and block 32 helping to assure no overpressure on the diaphragms.

In the complex valve apparatus of the invention, the housing for the diaphragm valve and the required inlet and outlet is conveniently formed by manifold member 22 and valving member 24. Moreover, in the apparatus demonstrated, there is the flow-through by-pass feature. Nevertheless, it will be realized that the valve could be modified to omit the continuous by-pass feature by eliminating the circular groove 108.

An advantageous aspect of the illustrated embodiment of the invention is that no valve is required in conduit 42 to shunt flow through the sample loop. This is achieved by constructing conduit 42 to have a substantially higher resistance to fluid flow than does the sample loop. This is advantageously achieved without the use of undue fluid mixing devices, i.e., without use of orifices, nozzles or the like. Use of a smaller diameter conduit is the preferred means for assuring a sufficiently high relative resistance in conduit 42. It is usually desirable that the resistance illustrated schematically as 42R in FIG. 1 be such that there is a flow in conduit 42 which is less than 25 percent of the flow in the sample loop. In the best embodiments of the invention, this is less than 1 percent of the flow in the sample loop. Another excellent means for controlling flow resistance in the primary conduit is the use of a biased flow resistor, e.g. a spring-loaded check valve which tends to close as pressure is released and flow is directed through the sample loop. Such a device enables handling of extremely high flow variations. In general, the approach by which one avoids manual activation of a flow-resisting means in primary 42 avoids a very delicate sequencing problem.

Another advantageous aspect of the invention is the use of a back-filling procedure, i.e. a procedure whereby the sample loop is filled backwards, i.e. from the end proximate the outlet port 49 towards the opposite end 45 of the loop. It has been discovered that the advantage of this structural innovation is that even the smallest injected sample, say one that would partially fill the annular space in conduit section 46a defined by a hypodermic needle and the wall of conduit section 56, can be ejected through valve 43 and port 49 in as nearly a plug-flow increment as is possible. Larger increments fill only space that they require and need not traverse any unnecessary conduit on being ejected from the sample loop. This minimizes peak spreading.

A third advantageous aspect of the illustrated embodiment of the invention, one which is particularly useful in combination with aforesaid backfilling procedure, is the use of a sample loop having segments of increased cross section as the loop becomes more remote from the focus of the sample injection. This feature, shown schematically in FIGS. 6 and 6A, allows larger samples to be injected without undesirable spreading of such a larger sample as could be caused by friction between the sample and the walls of necessarily-longer segments of small conduits having comparative volumes. A typical scheme for increasing loop volumes would be (a) a 0.020 inch-diameter segment 0.2 inches in length, (b) a 0.030 inch-diameter segment 5 inches long, (c) a 0.045 inch-diameter section 15 inches long and (d) a 0.065 inch-diameter 20 inches long. With such a sample loop, a primary conduit of 0.009 inch inside diameter and three feet in length would be useful to achieve sufficient resistance to flow and thereby direct flow through the sample loop.

FIGS. 6 and 6A are both drawn with reference to ends 46a and 45 of a sample loop as shown in FIG. 1. FIG. 6 shows a series of segments (146a, 146b, 146c and 146d) of a loop 146 which increases in diameter as the loop becomes more remote from end 46a (at which the sample is first injected into the loop from a syringe and from which the sample is subsequently ejected). FIG. 6A, shows, schematically, a similar loop 246 wherein the changes in diameter are more gradual, thereby further diminishing any entrance effects on flow between segments of differing diameter and thereby reducing any resulting peak spreading effect.

FIG. 7 is a schematic diagram of the flow pattern of an injector mechanism of the invention used in conjunction with a liquid chromatography system 130. As has been indicated above, a prime object of the invention is to obtain a reliable injection of small liquid samples into the inlet stream to a chromatography column as at 132. The material will traverse the column and on emergence be subjected to analysis by, say, a refractometer 134. Associated recording apparatus 136 will normally be utilized to provide a graphic representation of the analysis. This general scheme is well known in the art.

In FIG. 5, an injector mechanism 138 is seen to comprise a sample loop conduit 139 and a primary conduit 140. Primary conduit 140 contains a flow-restriction means R which is used to assure a condition of the primary conduit can be achieved whereby all flow will be diverted through conduit 139 whenever conduit 139 is "open". In the preferred embodiment of applicants' invention which has been described above, the flow-restriction means R is the conduit itself because the conduit is selected to have a diameter much smaller than the diameter of loop 139. But those skilled in the art, on reading this disclosure, will realize that valves or other flow-restricting means can be used to impart the required flow-resistance R to conduit 140.

In normal operation, a carrier liquid will be flowing through conduit 140 and valves 141 and 143 will be closed to assure flow does go through conduit 140. Next valves 144 and 145 are opened and sample liquid is injected through 144 into line 139 toward valve 145. Valve 145 allows any excess liquid to be vented from the system by the liquid injected into line 139. Thereupon both valves 144 and 145 are closed; each of valves 143 and 141 are opened and the flow of carrier liquid sweeps through valve 141, line 139 and valve 143 into column 132.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. In a complex valve apparatus of the type comprising a main inlet valve, a main outlet valve, a primary conduit between said main inlet and outlet valves, an auxiliary inlet port, a sample loop of fixed volume connecting said auxiliary inlet port with said main inlet valve, and valve means to divert at least a major part of flow from said primary conduit through said sample loop, valving means to vent said sample loop from said system the improvement wherein said sample loop communicates with both (1) said main outlet valve and (2) said auxiliary inlet port at a position immediately adjacent the inlet to said outlet valve, said sample loop forming means to receive a liquid sample in a direction from its terminal point adjacent said outlet valve towards said vent means and wherein said means to divert sample loop also forms means to eject substantially all of sample liquid from the apparatus through said main outlet valve.

2. A complex valve apparatus as defined in claim 1 wherein said sample loop is increased in diameter from a point adjacent said outlet valve as it extends toward said inlet valve.

3. A complex valve apparatus as defined in claim 1 wherein said means to divert flow through said sample loop comprises static flow-resisting means in said primary conduit and said primary conduit is free of moveable valving parts.

4. A complex valve apparatus as defined in claim 2 wherein said means to divert flow through said sample conduit comprises static flow-resisting means in said primary loop and said primary loop is free of moveable valving parts.

5. Apparatus as defined in claim 3 wherein the average diameter of said primary conduit is less than about one-half the smallest diameter of any segment of said sample loop.

6. Apparatus as defined in claim 4 wherein the average diameter of said primary conduit is less than about one-half the smallest diameter of any segment of said sample loop.

7. In a chromatography apparatus of the type comprising (1) a separation column to which is connected a supply of carrier liquid to establish continuous flow thereof through said column, (2) and means to inject liquid samples into said continuously flowing carrier liquid that said liquid sample may be carried into said column, the improvement wherein said injection means is a complex valve of the type comprising a main inlet valve, a main outlet valve, a primary conduit between said main inlet and outlet valves, an auxiliary inlet port, a sample loop of fixed volume connecting said auxiliary inlet port with said main inlet valve, and valve means to divert at least a major part of flow from said primary conduit through said sample loop, valving means to vent said sample loop from said system, and wherein said sample loop communicates with both (1) said main outlet valve and (2) said auxiliary inlet port immediately adjacent said outlet valve, said sample loop forming means to receive a liquid sample from its terminal point adjacent said inlet valve towards said vent means relatively remote from said outlet valve, and wherein said means to divert also forms means to eject substantially all of sample liquid from the apparatus through said main outlet valve.

8. Chromatography apparatus as defined in claim 7 wherein said sample loop is generally increased in diameter from a point adjacent said outlet valve as it extends toward said inlet valve.

9. Chromatography apparatus as defined in claim 7 wherein said means to divert flow through said sample loop comprises static flow-resisting means in said primary loop and said primary loop is free of moveable valving parts.

10. Chromatography apparatus as defined in claim 8 wherein said means to divert flow through said sample loop comprises static flow-resisting means in said primary conduit and said primary conduit is free of moveable valving parts.

11. Chromatography apparatus as defined in claim 9 wherein the average diameter of said primary conduit is less than about one-half the smallest diameter of any segment of said sample loop.

12. Chromatography apparatus as defined in claim 10 wherein the average diameter of said primary conduit is less than about one-half the smallest diameter of any segment of said sample loop.

13. In a process for injecting a relatively small sample of liquid into a continuous stream of liquid wherein a continuous stream of liquid is adapted to carry the sample into a liquid chromatograph apparatus and wherein the process comprises the steps of placing said sample in an elongate sample-holding conduit and diverting flow of the carrier fluid from a normal flowpath through said elongate conduit to carry said sample into the chromatograph apparatus, the improvement comprising the steps of (a) injecting said sample in a volume smaller than that of said sample-holding conduit into said sample-holding conduit so that it flows from that end of said sample conduit closest to said chromatograph towards the opposite end of said sample conduit, partially filling said sample conduit, and venting said sample-holding conduit from said system at an opposite end of said sample conduit.

14. A process as defined in claim 13 wherein said flow of carrier fluid is diverted through said sample conduit by the step of opening a valve between the normal flow path of said carrier fluid and said sample conduit and between the sample conduit and said column and without any positive steps to block the normal flow of said carrier fluid.

15. A complex valve apparatus as defined in claim 1 wherein said apparatus has a diaphragm valve which comprises A. A first housing member comprising inlet and outlet conduits and ports communicating therewith;

B. A second housing member forming means to guide a diaphragm-operating rod;

C. A thin metallic diaphragm adapted to be held snugly in sealing contact with said first housing member and in compression between both said housing members, said diaphragm comprising a flow channel in the face thereof adapted to be held against said first housing member;

D. wherein said operating rod forms means to flex said diaphragm and to position a sealing face of said diaphragm and to position a sealing face of first housing member; and E. wherein substantially all fluid volume between inlet and outlet conduits of said valve in its closed position, is formed by said flow channels in said diaphragm.

16. Apparatus as defined in claim 15 wherein a ductile coating of a material selected from a metal or a plastic, said coating being less than about 0.002 inches in thickness, forms means to promote said sealing contact between said first housing member and said diaphragm.

17. Apparatus as defined in claim 15 wherein said diaphragm comprises an annular flow path, forming with said first housing member a means for bypassing said sealing face, said annular flow path connecting an inlet conduit and an outlet conduit in said first housing member.

18. Apparatus as defined in claim 16 wherein said diaphragm comprises an annular flow path, forming with said first housing member a means for bypassing said sealing face, said annular flow path connecting an inlet conduit and an outlet conduit in said first housing member.

19. Apparatus as defined in claim 15 wherein said diaphragm is removeable from said apparatus by the separation of said first housing member and said valving member and said valve comprising no additional means for retaining said diaphragm.

20. Apparatus as defined in claim 18 wherein said diaphragm is removeable from said apparatus by the separation of said first housing member and said valving member and said valve comrising no additional means for retaining said diaphragm.

21. Apparatus as defined in claim 17 wherein said diaphragm is removeable from said apparatus by the separation of said first housing member and said valving member and said valve comprising no additional means for retaining said diaphragm.

22. Apparatus as defined in claim 15 wherein said diaphragm valve is said main outlet valve communicating with said sample loop.

23. Apparatus adapted for use in feeding a discrete sample into a chromatographic column, said apparatus comprising
   a primary conduit for transporting liquid to said column;
   a supplementary conduit of fixed volume forming means to bypass said primary conduit;
   valve means for isolating said supplementary conduit from said primary conduit;
   a valve forming means to admit a liquid sample into said supplementary conduit at an end of said supplementary conduit nearest said chromatographic column;
   a vent valve in said supplementary conduit, said vent valve being at a position in said supplementary conduit that is more remote from said column than said valve forming means to admit and said vent valve forming means to vent said conduit of fixed volume to a point outside said apparatus, and;
   flow restriction means in said primary conduit forming means to divert said primary conduit through said supplementary conduit in a direction from said vent position toward said valve forming means to admit and thence to said chromatographic column, and wherein said liquid flow diversted from said primary conduit forms means to eject substantially all of said sample from said apparatus at end of said supplementary conduit nearest said chromatographic column.

24. Apparatus as defined in claim 23 wherein said supplementary conduit is increased in diameter from a point adjacent said valve forming means to admit liquid as said supplementary conduit extends toward said vent valve.

25. Apparatus as defined in claim 23 wherein said flow restriction means is a static flow-resisting means.

26. Apparatus as defined in claim 24 wherein said flow restriction is a static flow-resisting means.

27. Apparatus as defined in claim 25 wherein said restriction forms means to reduce flow in said primary conduit to less than 25 percent of flow in said supplementary conduit.

28. Apparatus as defined in claim 3 wherein said static flow resisting means forms means to reduce flow in said primary conduit to less than about 25 percent of flow in said sample loop.

29. Apparatus as defined in claim 9 wherein said static flow resisting means forms means to reduce flow in said primary conduit to less than about 25 percent of flow in said sample loop.

* * * * *

UNITED STATES PATENT OFFICE
CERTIFICATE OF CORRECTION

Patent No. 3,916,692　　　　　　　　　　Dated November 4, 1975

Inventor(s) Louis Abrahams and Burleigh M. Hutchins, Jr.

It is certified that error appears in the above-identified patent and that said Letters Patent are hereby corrected as shown below:

Column 1, line 18　--the-- should be "this"
Column 2, line 55　before --the-- should be "to"
Column 4, line 60　--valve-- should be "valves"
Column 9, line 20　--conduit-- should be "loop"
Column 9, line 21　change "loop" in both occurrences to --conduit--
Column 9, line 50　--inlet-- should be "outlet"
Column 11, line 7　before --valve-- insert "complex"
Column 11, line 12　before --valve-- insert "complex"
Column 11, line 17　before --valve-- insert "complex"

UNITED STATES PATENT OFFICE
CERTIFICATE OF CORRECTION

Patent No. 3,916,692      Dated November 4, 1975

Inventor(s) Louis Abrahams and Burleigh M. Hutchins, Jr.

It is certified that error appears in the above-identified patent and that said Letters Patent are hereby corrected as shown below:

Column 10, line 28 delete "a valve" and insert --valves--;

Column 11, line 1? "comrising" should be --comprising--;

Column 12, line 11 "diversted" should be --diverted--;

Signed and Sealed this eleventh Day of May 1976

[SEAL]

Attest:

RUTH C. MASON  
Attesting Officer

C. MARSHALL DANN  
Commissioner of Patents and Trademarks